United States Patent [19]

Rhee

[11] 3,920,172

[45] Nov. 18, 1975

[54] CONDUCTIVE GLASS SEAL ASSEMBLY

[75] Inventor: Seong K. Rhee, Livonia, Mich.

[73] Assignee: The Bendix Corporation, Southfield, Mich.

[22] Filed: Oct. 3, 1974

[21] Appl. No.: 511,854

[52] U.S. Cl.................... 228/124; 156/89; 65/59 R; 29/592; 29/624; 339/DIG. 3
[51] Int. Cl.²........................................ C03C 27/02
[58] Field of Search...... 228/121, 122, 124; 156/89; 65/59 R; 174/78, 151, 152 GM; 313/136; 204/1 S, 195 S; 339/DIG. 3; 29/592, 624, 628

[56] References Cited
UNITED STATES PATENTS

| | | | |
|---|---|---|---|
| 2,280,962 | 4/1942 | McDougal | 313/136 X |
| 3,057,951 | 10/1962 | Blakely | 174/78 |
| 3,367,696 | 2/1968 | Langley | 228/122 X |
| 3,492,409 | 1/1970 | Williams et al. | 174/78 |
| 3,525,894 | 8/1970 | Blum | 313/136 |
| 3,640,906 | 2/1972 | Wojcik | 65/59 R |
| 3,835,012 | 9/1974 | Hemak | 204/195 S |

*Primary Examiner*—Al Lawrence Smith
*Assistant Examiner*—K. J. Ramsey
*Attorney, Agent, or Firm*—Raymond J. Eifler; William G. Kratz; Edward J. Whitfield

[57] ABSTRACT

This invention relates to an improved ceramic to metal conductive glass seal and to a process of forming an oxidation and corrosion resistant conductive glass seal between a ceramic and metal member.

8 Claims, 1 Drawing Figure

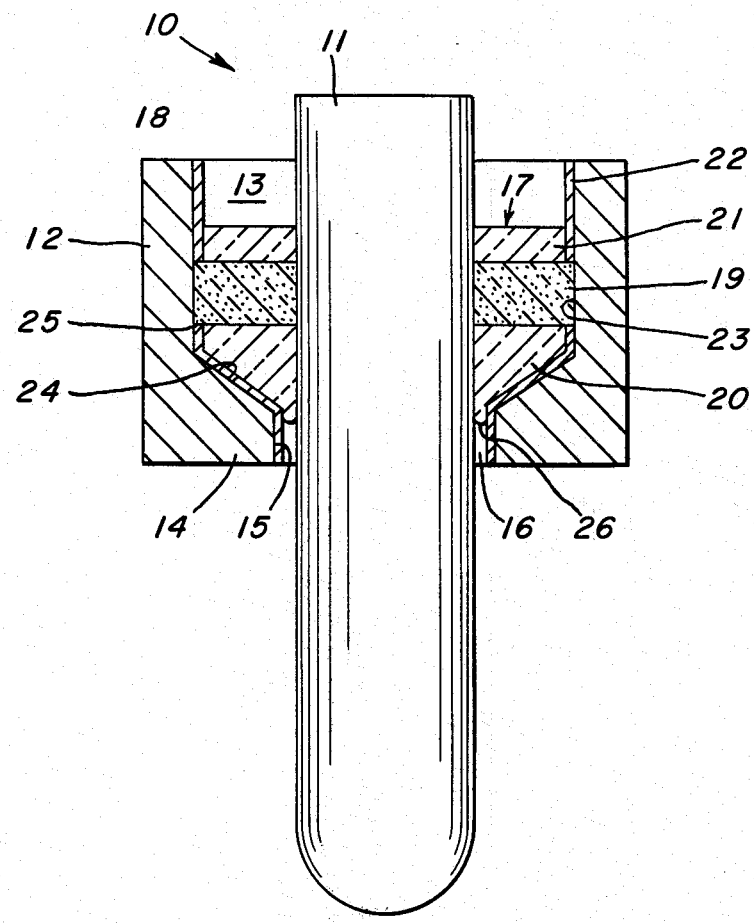

CONDUCTIVE GLASS SEAL ASSEMBLY

BACKGROUND OF THE INVENTION

Electrically conductive glass is well-known in the art and comprises a mixture of glass and metal powders such as, for example, copper and tin as described in U.S. Pat. No. 3,525,894. Conductive glass is useful in a variety of applications and is particularly useful for forming an electrically conductive path between ceramics and metals wherein the glass is fused at elevated temperatures and bonds to both the metal and ceramic thereby forming an hermetic, electrically conductive seal therebetween.

It has been found that such seals function satisfactorily as long as the service temperature is not too high and the service environment is not too corrosive. For example, at service temperatures of 500°C. or higher, the metal particles in the conductive glass will oxidize, resulting in an increase in volume of the conductive glass which causes fracturing of the ceramic member. Such high temperatures, in addition to exposure to a corrosive atmosphere, is experienced by, for example, zirconium oxide oxygen sensors used to monitor the oxygen content of automotive exhaust systems.

SUMMARY OF THE INVENTION

The improved conductive glass seal of the invention is characterized by disposing a layer of conductive glass 19 between two layers 20 and 21 of non-conductive glass or other non-conductive ceramic material and fusing and densifying the layered glass at an elevated temperature and pressure whereby the glass layers are bonded to a ceramic member 11 and a metal member 12 forming an electrically conductive seal therebetween.

DESCRIPTION OF THE DRAWING

The accompanying drawing is a schematic illustration, partly in section, of an automotive exhaust oxygen sensor embodying the conductive glass seal of the invention.

DETAILED DESCRIPTION OF THE INVENTION

With reference to the drawing, an automotive exhaust oxygen sensor is depicted at 10. A more detailed description as regards the construction and operation of automotive exhaust oxygen sensors may be found in the Society of Automotive Engineers Paper No. 730575, entitled "Sensor For On-Vehicle Detection of Engine Exhaust Gas Composition," Fleming, et al., the teachings of which are incorporated by reference herein. The sensor 10 comprises a tube 11 formed principally of zirconium oxide. Disposed about the tube 11 and coaxial therewith is a generally cylindrical steel housing 12, having an inside diameter greater than the diameter of tube 11, thus forming an annular space 13 between tube 11 and housing 12. The lower end of housing 12 is formed in an inwardly directed radial flange 14, the inner surface 15 of flange 14 terminating in proximate relationship with tube 11, forming a narrow annular gap 16 between tube 11 and surface 15. A hermetic conductive glass seal 17 is disposed within the annular space 13 and is bonded to the inner surface 18 of housing 12 and the tube 11. The glass seal 17 comprises a layer of conductive glass 19 disposed between two layers 20 and 21 of non-conductive glass, said conductive glass 19 providing an electrically conducting path between housing 12 and tube 11.

The seal 17 is preferably formed in the following manner:

The stainless steel housing is first cleaned in hot, hydrochloric acid, followed by an alcohol rinse. The housing 12 is subjected to an atmosphere of wet hydrogen at about 1800°F. for about 30 minutes. This treatment produces a thin oxide film 22, the presence of which improves the bond between the non-conductive glass 20, 21 and the housing. The thickness of the oxide film is from about 0.05mm to about 5mm. The oxide film 22 is removed by machining or the like from the annular area 23 of the inner surface 18 of housing 12 that will be in contact with the conductive glass layer 19.

The tube 11 is inserted in the housing 12, the assembly being held in place by a jig or the like. A first layer 20 of powdered glass is placed in the annular space 13, sufficient glass powder being used to fill up the space between the upper surface 24 of flange 14 and the lower boundary 25 of area 23. The glass employed is preferably Corning 7056 of about 200 to 280 mesh. If desired, a small amount, i.e., from about 1 to 3%, of an organic binder such as hydrogened cottonseed oil, carboxyl and methyl cellulose, 1201 wax or the like may be admixed with the powdered glass to facilitate handling.

A second layer 19 of conductive glass powder is disposed atop the first layer 20 in sufficient quantity to fill up the space defined by annular area 23. Any conductive glass may be employed, such as for example, the conductive glass described in U.S. Pat. Nos. 2,106,578; 2,248,415 and 3,525,894, the teachings of which as relate to the preparation of such materials are hereby incorporated by reference.

A third layer 21 of powdered glass, of the same composition as first layer 20, is disposed atop the second layer 19.

The assembly is heated in a nitrogen atmosphere, at a temperature of about 1200°F. for about 30 minutes, which will cause the glass to soften. While the glass is in a softened condition, pressure is applied to densify and compact the layers, sufficient pressure being employed to force a small amount of glass 26 into the annular gap 16 between surface 15 of flange 14 and tube 11. It is recommended that a pressure of at least about 500 p.s.i. be employed. The assembly is then cooled.

Although the preparation of the seal has been described with reference to the use of powdered glass, it will be realized that a preformed glass ring may also be used in place of a layer of powdered glass. The dimensions of the glass ring are such that the outside diameter of the ring is slightly less than the inside diameter of the housing and the inside diameter of the ring is slightly larger than the diameter of the zirconium tube, the thickness of the ring depending upon the desired thickness of the layer. In this latter respect, the relative thickness of a glass layer, whether powdered glass or a glass ring is used, is of no particular criticality and would depend on the application in which the seal is employed.

The process produces an hermetic glass seal that forms a firm, non-oxidizing, corrosion resistant, conductive metal to ceramic seal capable of withstanding prolonged exposure to elevated temperatures and corrosive environments. Although the invention has been described with particular reference to its utility in an automotive exhaust oxygen sensor, it will, of course, be realized that the conductive glass seal described herein may be used in a variety of applications wherein it is desired to form a hermetic conductive ceramic to metal seal.

What is claimed is:

1. A process for making a hermetic ceramic to metal electrically conductive glass seal assembly comprising:
   a. disposing a layer of glass between a metal member and a ceramic member;
   b. disposing a layer of conductive glass atop the layer of glass;
   c. disposing a layer of glass atop the layer of conductive glass;
   d. heating the glass layers at an elevated temperature to soften the glass; and
   e. applying pressure to the softened glass to densify and compact the layers.

2. The process of claim 1 wherein the glass layers are in powdered form and are heated at a temperature of about 1200°F. for about 30 minutes.

3. The process of claim 2 wherein the glass layers are heated in a nitrogen atmosphere.

4. The process of claim 1 wherein a pressure of at least about 500 p.s.i. is applied to the softened glass layers.

5. The process of claim 1 wherein the metal member is stainless steel.

6. The process of claim 5 wherein those areas of the stainless steel member that are in contact with the non-conductive glass layers have formed thereon a thin oxide film, said film being formed by subjecting the said member to an atmosphere of wet hydrogen at an elevated temperature.

7. The process of claim 6 wherein the stainless steel member is subjected to said atmosphere of wet hydrogen for about 30 minutes at a temperature of about 1800°F.

8. The process of claim 6 wherein the oxide film has a thickness of from about 0.05mm to about 5mm.

* * * * *